Nov. 4, 1952 E. COHEN 2,616,964
SYNCHRONIZING SEPARATOR FOR TELEVISION RECEIVERS
Filed May 19, 1949
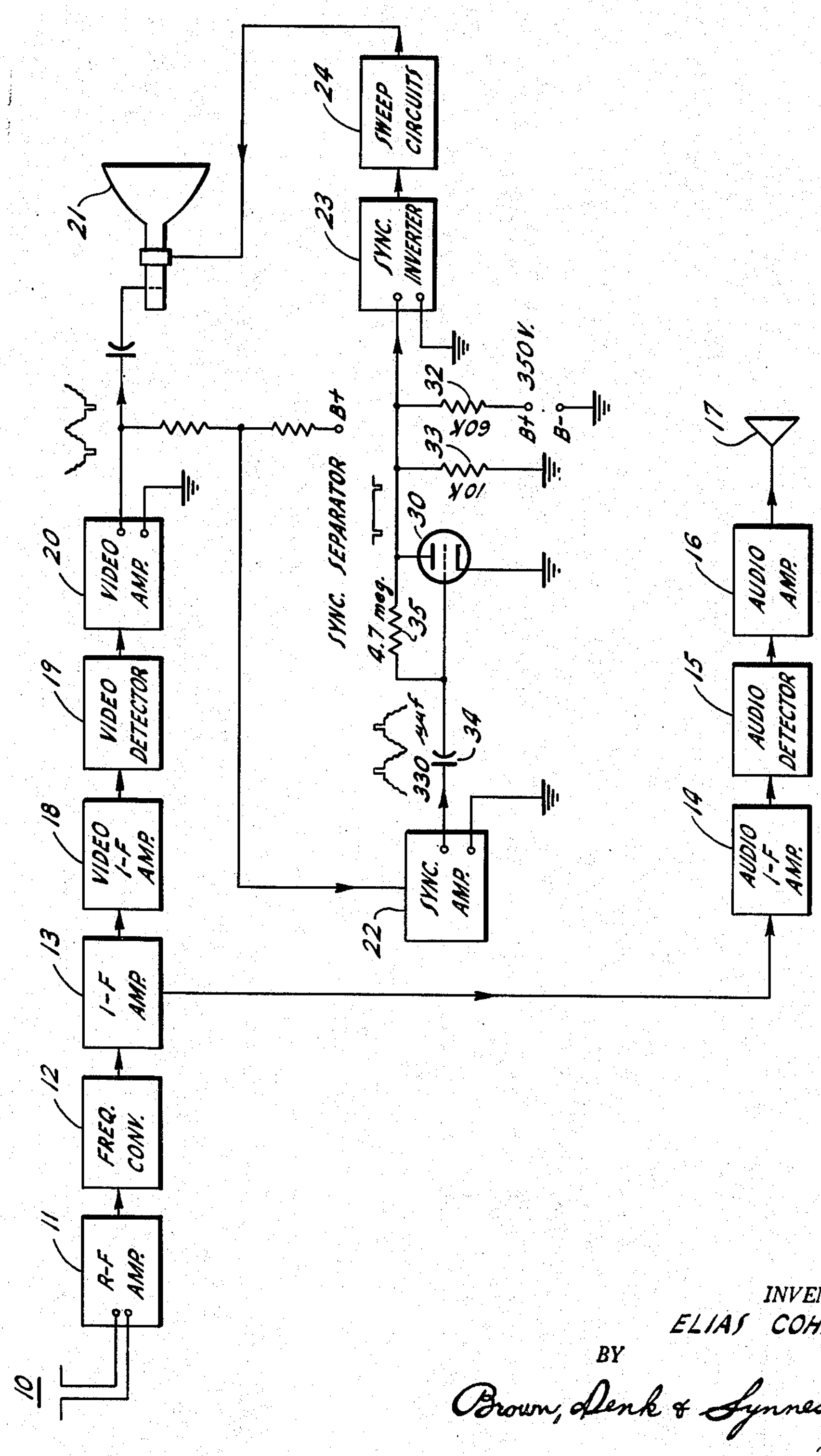
INVENTOR.
ELIAS COHEN
BY
Brown, Denk & Synnestvedt
AGENTS Patented Nov. 4, 1952

2,616,964

UNITED STATES PATENT OFFICE 2,616,964

SYNCHRONIZING SEPARATOR FOR TELEVISION RECEIVERS

Elias Cohen, Philadelphia, Pa., assignor to Philco Corporation, Philadelphia, Pa., a corporation of Pennsylvania Application May 19, 1949, Serial No. 94,187

1 Claim. (Cl. 178—7.3)

The invention hereindescribed and claimed relates to a synchronizing-signal separator circuit for a television receiver.

In a television receiver, it is the function of the synchronizing-signal separator circuit to derive, usually from the detected video signal, the horizontal and vertical synchronizing pulses which extend from the blanking signal into the blacker-than-black region. The separated synchronizing pulses are then applied to, and control the action of, sweep circuits which effect the horizontal and vertical deflections of the cathode-ray-tube beam.

A large variety of synchronizing-signal separator circuits have been provided by the prior art. Some of the prior-art separator circuits have excellent operating characteristics but have the disadvantage of being complex and expensive. Others, which are more simple in structure and less expensive, have not been entirely satisfactory insofar as their operating characteristics are concerned. The present invention provides an improved separator circuit of the simple, relatively inexpensive, type.

Some of the prior-art separator circuits employ input networks having relatively long time constants, as for example, of the order of one-tenth of a second. Others employ input networks having substantially shorter time constants, as for example, of the order of one-thousandth of a second. The present invention provides an improved separator circuit of the short-time-constant type.

The short-time-constant type of separator circuit is ordinarily preferable when the sweep circuits of the television receiver include an oscillator which is stabilized by the average repetition frequency of the synchronizing pulses.

Prior-art separator circuits of the short-time-constant type have not, however, been entirely satisfactory. It has been noticed that their operation is disturbed to a substantially greater extent by short bursts of high-amplitude noise than is the operation of the long-time-constant type of separator circuit. The reason for the greater stability of the long-time-constant separator circuit in the presence of high-amplitude noise of short duration is that the large series input capacitor of the long-time-constant circuit is charged to but a fraction of the peak voltage of the applied noise pulse. Nevertheless, the short-time-constant separator circuit is preferable in at least certain applications, as has been indicated above.

The problem involved is most serious when the television receiver is located in an electrically noisy area. There, the normal action of the separator circuit is so disturbed that intermittent but persistent tear-out of horizontal lines occur, together with an occasional shift of the picture frame vertically. In other locations, where the noise pulses are of lesser amplitude and occur less frequently, the problem is less serious. Nevertheless, even the occasional tear-out of a relatively small number of picture lines is objectionable.

It is a principal object then of this invention to provide, in a television receiver, a simple and inexpensive synchronizing-signal separator circuit of the short-time-constant type whose operation, in the presence of noise pulses, is considerably better than that of prior-art separator circuits of similar type and simplicity.

It is another object of this invention to provide a simple, short-time-constant type of synchronizing-signal separator circuit capable of functioning in an improved manner under conditions of low signal strength and high-amplitude noise.

The foregoing objects are attained by modifying the prior-art separator circuit to return the grid leak, not to cathode either directly or by way of ground as is conventional, but to a source of potential substantially more positive than the cathode potential.

The objects, features and advantages of the invention, and the manner in which the objects are attained, will be most readily understood by considering the following detailed description and accompanying single figure of drawing wherein is illustrated in partly diagrammatic, partly schematic, form an otherwise conventional television receiver into which the improved synchronizing-signal separator circuit of the present invention has been incorporated.

Referring now to the drawing, there is shown a television receiver which includes an antenna 10, an R-F amplifier stage 11, a frequency converter stage 12, and a first stage of audio and video I-F amplification 13. Following the audio and video I-F amplifier stage 13, the audio and video I-F signals are separated into different channels. The audio channel may comprise an audio I-F amplifier 14, an audio detector 15, an audio amplifier 16, and a loudspeaker 17, while the video channel may comprise several additional stages of video I-F amplifier 18, a video detector 19, a video amplifier 20 and a picture tube 21.

A portion of the output of the video amplifier 20 is fed to a synchronizing-pulse amplifier 22 whose functions include that of inverting the polarity of the video signal from one in which the synchronizing pulses extend negatively to one in which the said pulses extend positively, as is indicated diagrammatically in the drawing. The output of the synchronizing-pulse amplifier 22 is applied to the synchronizing-pulse separator circuit shown schematically in the drawing and suitably marked. The synchronizing pulses derived by the separator circuit are supplied, by way of an inverter circuit 23, to the sweep circuits 24, and the saw-tooth signals developed by the sweep circuits 24 are applied to picture tube 21.

Except for the synchronizing-signal separator circuit, into which the improvement of the present invention has been incorporated, both the structure and operation of the television receiver shown in the drawing is entirely conventional and will not be described further.

A portion of the synchronizing-signal separator circuit is also conventional and will be described first. The separator tube may be either a triode, pentode, or other type of tube. In the drawing a triode 30 is shown whose plate is connected to a source of positive supply voltage, B+, by way of a voltage-divider circuit. The voltage-divider circuit comprises resistors 32 and 33 of which resistor 32 is of substantially larger magnitude. In a typical case, the value of resistor 32 may be 60,000 ohms and resistor 33 may be 10,000 ohms. Then, if the full B+ supply voltage be 350 volts, the D.-C. plate voltage on the separator tube 30 will be fifty volts. This is the order of magnitude of voltage conventionally employed on the plate of a synchronizing-signal separator tube, a low plate voltage being employed so that the applied synchronizing pulses, even of relatively weak signals, may be able to drive the tube from cutoff to plate-current saturation. The clipping action effected by plate-current saturation provides output pulses of uniform amplitude from applied pulses whose amplitudes may vary relatively widely.

The voltage-divider resistors 32 and 33 also function as the load network for the plate circuit of the separator tube. The cathode of the separator tube is connected directly to ground.

The video signal, whose synchronizing-pulses extend in a positive direction, is applied to the grid of the sync-separator tube by way of a coupling capacitor 34.

That portion of the synchronizing-signal separator circuit thus far described is conventional. If the entire separator circuit were conventional, a shunt resistor or grid leak would be connected between the grid and cathode of the separator tube, ordinarily by way of ground. In accordance with by invention, however, the grid leak is not returned to cathode, either directly or by way of ground, but is returned to a source of D.-C. voltage of suitable magnitude substantially more positive than the cathode potential. It will frequently happen that the D.-C. voltage applied to the plate of the sync-separator tube will be of suitable magnitude, and, since this voltage is readily available, the grid leak 35, in the preferred embodiment of my invention, is returned to the plate of the sync-separator tube. However, the grid leak may, in other instances, be returned to other sources of positive voltage of suitable magnitude, either specially provided or available. An example of the latter is the screen grid voltage, where a pentode is employed in the separator circuit.

The improvement to be derived from the above-described departure from conventional practice is substantial and important, as will become clear.

It was stated previously hereinabove that my invention relates to an improvement in a short-time-constant type of sync-separator circuit which ordinarily employs a time constant of the order of one-thousandth of a second.

In the circuit illustrated in the drawing, capacitor 34 is shown to have a value of 330 micro-microfarads and resistor 35 a value of 4.7 megohms. In such case, the time constant of the combination would be 1551 microseconds, which is equivalent to about 24 line periods. The values shown are intended to be typical, and not limiting.

Insofar as the time constant is concerned, the improved circuit of the present invention does not differ from the prior-art short-time-constant separator circuit. In both cases, the time constant of the capacitor-resistor network is required to be long relative to a line period, but very short compared to one field or frame period. This is necessary in order to avoid having the capacitor discharge to such an extent between synchronizing pulses that the separator tube conducts during the blanking-signal or picture-signal intervals.

Attention is here invited to the fact that in the short-time-constant type of separator circuit, both of the prior art and of the present invention, the RC input network exerts a high-pass filtering action so that, in the absence of the separator tube, the vertical synchronizing pulses would not pass through. However, the grid-cathode portion of the separator tube, acting as a diode and in cooperation with the coupling capacitor and grid leak, effects restoration of the D.-C. and low-frequency components of the video signal. Consequently, the vertical synchronizing pulses are present in the output of the separator circuit.

Before discussing the advantages of the improved circuit, it will be helpful to consider the operation of the prior-art short-time-constant separator circuit. In the prior-art circuit, the grid leak is connected to cathode, ordinarily by way of ground. The video signal applied to the separator circuit is of such polarity that the synchronizing pulses extend in the positive direction. In the absence of an applied video signal, the separator tube of the prior art is zero biased. The applied video signal drives the grid positive, grid current flows, and the coupling capacitor is rapidly charged negatively to a magnitude corresponding to the positive peak amplitude of the applied video signal as measured from the average signal level, i. e., the capacitor charges to a voltage corresponding to the tips of the synchronizing pulses. The shunt grid leak is of high resistance and the charge leaks off very slowly during the intervals between synchronizing pulses. Consequently, the input network of the separator tube levels on the tips of the synchronizing pulses and the bias voltage developed across the grid leak prevents plate current from flowing except during the brief synchronizing-pulse intervals. The time constant of the capacitor-resistor input circuit being long compared to a line period, there is no substantial variation in the grid bias from line to line, and in the absence of strong noise pulses, the prior-art separator circuit operates in a satisfactory manner.

Consider now what happens, in the prior-art circuit, when strong noise pulses are present. The signal applied to the grid of the separator tube then includes positive noise pulses whose amplitudes may be several times the amplitude of the video signal. Moreover, a number of such noise pulses may occur in a single line period. Under these conditions, the right-hand plate of the coupling capacitor is charged negatively to substantially the peak value of the noise impulse as measured from the average signal level, the input impedance of the tube being very low in the positive-grid region. The negative charge thus developed across the coupling capacitor acts to bias the separator tube far below plate-current cutoff. And, since the RC time constant of the coupling capacitor and the grid leak may be of the order of twenty line periods, a substantial number of line periods may pass before the capacitor is discharged sufficiently to permit the separator circuit to function in a normal manner.

As indicated hereinbefore, the present invention proposes that the grid leak be returned to a source of voltage of selected magnitude substantially more positive than the cathode potential. Preferably, the grid leak may be returned to the plate of the sync-separator tube. When this is done, the coupling capacitor 34 discharges during the interval between synchronizing pulses, not toward cathode or ground potential as in the prior-art circuits, but toward the voltage of selected magnitude substantially more positive than the cathode. Then, when a noise burst occurs and coupling capacitor 34 is charged far negative, the time required for the capacitor to discharge to its normal operating value is substantially shorter than where the capacitor discharges toward cathode or ground potential. As a consequence, the number of synchronizing pulses which are lost following a noise burst is substantially reduced.

The improvements accomplished by my invention are particularly great where the applied video signal is of low signal strength. In the prior art circuit, the difference in time required for the separator circuit to resume normal operation, following strong electrical noise disturbance, is a function of video signal strength, being longer where the video signal strength is low than where it is high. This is due to the fact that the negative bias developed across the grid leak is a direct function of video signal strength. Consequently, when the coupling capacitor is charged far negative as a result of a burst of electrical noise, the capacitor must discharge to an operating bias which, in the case of a video signal of low strength, is relatively close to ground potential. And, as is well known, the time required for a capacitor which is being discharged to ground to reach a value close to ground potential is very long.

In my improved circuit, the time required for the separator circuit to function normally, following a strong electrical noise disturbance, is not substantially different for low-strength video signals than for strong signals. This is due to the fact that the capacitor is discharging to a positive voltage whose value is relatively far removed from that of the negative bias which corresponds to normal operation of the separator circuit. And this is so, even though the bias corresponding to normal operation be relatively close to ground potential, as in the case of video signals of low signal strength.

Stated graphically, in my improved circuit, following a noise burst, the negative bias to which the capacitor must discharge before normal operation is reestablished is located on a portion of the discharge curve which is relatively steep in comparison with that of the prior-art circuit. As a consequence, the bias corresponding to normal separator-circuit operation is reached relatively quickly by the discharging capacitor.

I have found that the circuit of the present invention effects an additional improvement entirely apart from that effected during high-amplitude noise disturbances. I have found that, for low-strength video signals, the new circuit improves very substantially the low-frequency restoring action of the separator circuit.

In the prior-art circuit, during the occurrence of the vertical-synchronizing-pulse portion of a low-strength video signal, the coupling capacitor discharges toward ground from a negative bias which is relatively close to ground potential. Consequently, the discharge takes place along that portion of the discharge curve which is relatively flat and the restoring action is not adequate to permit plate current to flow except perhaps on the very tips of the vertical-synchronizing pulses. Superimposed upon the tips of the vertical-synchronizing pulses is considerable random noise of small amplitude due, for example, to thermal agitation unavoidably present in the circuit. As a consequence the vertical-synchronizing pulses developed in the output circuit of the separator do not contain sufficient energy to insure positive control of the sweep-oscillator circuits.

The above situation is remedied in my improved circuit by reason of the fact that, during the occurrence of the vertical-synchronizing pulses, the capacitor discharges, not toward ground potential but toward the selected positive voltage. The discharge, therefore, takes place along the relatively steep portion of the discharge curve and the restoring action of the separator circuit is substantially improved.

With respect now to the magnitude of the positive voltage to which, in accordance with my invention, the grid leak is returned, the voltage should be sufficiently large to accomplish a substantial increase in the rate at which the coupling capacitor is discharged, particularly when the video signal strength is low. On the other hand, the voltage should not be so large that, in the absence of noise impulses, the coupling capacitor discharges so rapidly in the intervals between synchronizing pulses that plate current flows during the blanking signal. The optimum value of positive voltage for a particular situation may be readily ascertained by experimentation. I have found, in general, that if the grid leak 35 be returned to a positive D.-C. voltage of the same order of magnitude as the negative bias developed on the grid of the separator tube by an applied video signal of minimum expected signal strength, a very noticeable and satisfactory improvement is accomplished with respect to the time required for the separator circuit to recover from electrical noise disturbances.

Having described my invention, I claim:

In a television receiver having a source of video-signal wave, said wave including picture signals and synchronizing signals, said synchronizing signals being of positive polarity; a separator circuit for deriving synchronizing signals from said wave, said separator circuit comprising: a tube having at least cathode, grid and plate electrodes; a source of positive D.-C. voltage connected to the plate of said tube; a capacitor coupling said source of video-signal wave to the grid of said tube; a grid leak connected between the grid and plate of said tube; and means, including an impedance in the plate-cathode circuit of said tube, for deriving an output voltage, said coupling capacitor, grid leak and D.-C. voltage source having such values that, by the diode action of said grid and cathode electrodes in cooperation with said coupling capacitor and grid leak, a negative bias is developed on said grid effective to render said tube non-conductive during the intervals that picture signals are applied thereto, said tube being adapted to be driven in conduction by said synchronizing signals applied thereto.

ELIAS COHEN.

REFERENCES CITED

The following references are of record in the file of this patent:

UNITED STATES PATENTS

| Number | Name | Date |
|---|---|---|
| 2,173,239 | Tolson | Sept. 19, 1939 |
| 2,176,663 | Browne et al. | Oct. 17, 1939 |
| 2,210,523 | Blumlein | Aug. 6, 1940 |
| 2,293,528 | Barce et al. | Aug. 18, 1942 |

FOREIGN PATENTS

| Number | Country | Date |
|---|---|---|
| 443,031 | Great Britain | Feb. 20, 1936 |

OTHER REFERENCES

Rider's TV Manual, vol. #1, Motorola TV, pages 1-45, 46.